(12) United States Patent
Tsai et al.

(10) Patent No.: US 9,429,702 B2
(45) Date of Patent: *Aug. 30, 2016

(54) LIGHT GUIDE STRUCTURE AND BACKLIGHT MODULE

(71) Applicant: Global Lighting Technologies Inc., Taoyuan (TW)

(72) Inventors: Chung-Lin Tsai, Taoyuan (TW); Jiun-Hau Ie, Taoyuan (TW); Jerry Wu, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,380

(22) Filed: Aug. 28, 2015

(65) Prior Publication Data

US 2015/0370005 A1 Dec. 24, 2015

Related U.S. Application Data

(63) Continuation-in-part of application No. 14/606,031, filed on Jan. 27, 2015, now Pat. No. 9,322,971, which is a continuation-in-part of application No. 13/911,102, filed on Jun. 6, 2013, now Pat. No. 9,004,737, which is a continuation-in-part of application No. 13/172,882, filed on Jun. 30, 2011, now Pat. No. 8,480,286, which is a continuation-in-part of application No. 12/464,104, filed on May 12, 2009, now Pat. No. 7,997,784.

(51) Int. Cl.
*F21V 8/00* (2006.01)
*B29K 101/12* (2006.01)

(52) U.S. Cl.
CPC ............. *G02B 6/0083* (2013.01); *G02B 6/009* (2013.01); *G02B 6/0021* (2013.01); *G02B 6/0065* (2013.01); *G02B 6/0068* (2013.01); *G02B 6/0073* (2013.01); *G02B 6/0085* (2013.01); *B29K 2101/12* (2013.01); *B29K 2995/0026* (2013.01)

(58) Field of Classification Search
CPC  G02B 6/0081; G02B 6/0021; G02B 6/0065; G02B 6/0068; G02B 6/0073; G02B 6/0085; G02B 6/009; B29D 11/0663
See application file for complete search history.

(56) References Cited

FOREIGN PATENT DOCUMENTS

JP      2006066236 A  *  3/2006
KR    20020076687 A  *  10/2002

* cited by examiner

*Primary Examiner* — Mary Ellen Bowman
(74) *Attorney, Agent, or Firm* — Jianq Chyun IP Office

(57) ABSTRACT

A backlight module including a light source module and a light guide structure is provided. The light source module includes a base, at least one light source and a first circuit layer. The base includes a carrying surface. The at least one light source is mounted on the carrying surface. The first circuit layer is integrated with the carrying surface and electrically connected to the light source. The light guide plate includes an engaging surface and at least one recess. The engaging surface is engaged with the light source module. The recess is disposed at the engaging surface for receiving the light source, wherein a material of the light guide plate and a material of the base are the same. The second circuit layer is integrated with the engaging surface, and electrically connected to the first circuit layer.

20 Claims, 3 Drawing Sheets

LIGHT GUIDE STRUCTURE AND BACKLIGHT MODULE

CROSS-REFERENCE TO RELATED APPLICATION

This application is a continuation-in-part application of and claims the priority benefit of U.S. prior application Ser. No. 14/606,031, filed on Jan. 27, 2015. This prior application Ser. No. 14/606,031 is a continuation-in-part application of and claims the priority benefit of a prior application Ser. No. 13/911,102, filed on Jun. 6, 2013, now patented as U.S. Pat. No. 9,004,737, which is a continuation-in-part application of and claims the priority benefit of a prior application Ser. No. 13/172,882, filed on Jun. 30, 2011, now patented as U.S. Pat. No. 8,480,286, which is a continuation-in-part application of and claims the priority benefit of U.S. patent application Ser. No. 12/464,104, filed on May 12, 2009, now patented as U.S. Pat. No. 7,997,784. The entirety of each of the above-mentioned patent applications is hereby incorporated by reference herein and made a part of this specification.

TECHNICAL FIELD

The technical field generally relates to a light guide structure and a backlight module. More particularly, the technical field relates to a light guide structure and a backlight module having the light guide structure.

BACKGROUND

A light guide plate is a key part of a backlight module, and the way to produce a light guide plate includes injection, embossing and extrusion. In general, a light emitting diode (LED) or a light source is arranged on the lateral side of the light guide plate, and the light emitted by the LED or the light source comes out uniformly from the surface of the light guide plate.

In a backlight module, everything else is supportive of the light guide plate, for example, a back reflector, a diffuser, and brightness enhancement films such as prismatic films which disposed on the top of the light guide plate to help narrowing viewing angles, which makes the light brighter or collimated. For the backlight module, there are a lot more components other than the light guide plate, such as printed circuit board (PCB), flexible printed circuit board (FPC), LEDs, wires, connectors, housings, metal-stamped or plastic frames, labels, etc. However, everything is surrounding the heart of the backlight module, which is the light guide plate.

The cited references of the prior art are listed below and considered irrelevant: U.S. Pat. Nos. 8,338,849, 8,384,114, 8,384,121, 8,466,488, 8,511,883, 8,365,3539, 8,680,567, US Pub. No. 2012/0170313, US Pub. No. 2012/0170317, US Pub. No. 2012/0327682, U.S. Pat. Nos. 8,573,827, 8,602, 631, US Pub. No. 2012/0170318, US Pub. No. 2013/0128614.

However, the conventional backlight module is generally configured by providing LEDs onto a circuit board, and the LEDs are electrically connected with the circuit board, so as to form an LED array, and then assembling the LED array into a light source accommodating space of the backlight module. Accordingly, in fabricating such a backlight module, the LEDs must be previously welded to the circuit board. Then, the circuit board, together with the LEDs welded thereon, is secured to light source accommodating space of the backlight module. As such, the process of the fabrication is relatively complex, and needs a high fabrication cost.

SUMMARY

Accordingly, the present disclosure is directed to a backlight module, wherein the manufacturing process thereof is simplified and the fabrication cost is reduced.

The present disclosure is further directed to a light guide structure adapted to be engaged with a light source module to form the backlight module described.

The present disclosure provides a light guide structure adapted to be engaged with a light source module, wherein the light source module includes a base and at least one light source mounted thereon. The light guide structure includes a light guide plate and a circuit layer. The light guide plate includes an engaging surface and at least one recess, wherein the engaging surface is adapted to be engaged with the light source module. The recess is disposed at the engaging surface for receiving the light source. A material of the light guide plate and a material of the base are the same. The circuit layer is integrated with the engaging surface for electrically connecting the light source.

The present disclosure further provides a backlight module including a light source module and alight guide structure. The light source module includes a base, at least one light source and a first circuit layer. The base includes a carrying surface. The at least one light source is mounted on the carrying surface. The first circuit layer is integrated with the carrying surface and electrically connected to the light source.

The light guide plate includes an engaging surface and at least one recess. The engaging surface is engaged with the light source module. The recess is disposed at the engaging surface for receiving the light source, wherein a material of the light guide plate and a material of the base are the same. The second circuit layer is integrated with the engaging surface, and electrically connected to the first circuit layer.

According to an embodiment of the disclosure, the light source is a flip chip light-emitting diode (LED).

According to an embodiment of the disclosure, the light source is a LED chip scale package (CSP).

According to an embodiment of the disclosure, the material of the light guide plate and the base is polycarbonate (PC).

According to an embodiment of the disclosure, the material of the light guide plate and the base is polyethylene terephthalate (PET).

According to an embodiment of the disclosure, a material of the circuit layer is indium tin oxide (ITO).

According to an embodiment of the disclosure, the light guide structure further includes an optical clear adhesive (OCA) disposed between the light guide plate and the base for bonding the light guide structure and the light source module.

According to an embodiment of the disclosure, the circuit layer is a sheet material integrated with the engaging surface and a plurality of wirings printed on the sheet material.

According to an embodiment of the disclosure, each of the first circuit layer and the second circuit layer is a sheet material and a plurality of wirings printed on the sheet material.

According to an embodiment of the disclosure, the first circuit layer comprises a plurality of first contacts, and the second circuit layer comprises a plurality of second contacts, the first contacts are electrically connected with the second contacts.

According to an embodiment of the disclosure, the backlight module further includes a reflective solder resist layer covering the carrying surface and exposing the second contacts.

According to an embodiment of the disclosure, the base further includes a back surface opposite to the carrying surface, and a reflective sheet disposed on the back surface.

According to an embodiment of the disclosure, the backlight module further includes a dark material disposed above the light source to decrease the luminance of light emitted from a top surface of the light source.

Based on the description above, the present disclosure provides a light guide structure and a backlight module having the same. The light guide structure is engaged with a light source module to form the backlight module and the light guide structure includes at least one recess. The circuit layer of the light guide structure integrated with a surface of the recess, so the light source of the light source module can be directly embedded in the recess and electrically connected to the circuit layer of the light guide structure. Therefore, the present disclosure simplifies the fabrication process of the backlight module and reduces the fabrication cost of backlight module.

Moreover, with the disposition of the circuit layers integrated with the surface of the light source module and the surface of the light guide structure respectively, the circuit layout of the backlight module for electrically connecting the light sources can be more flexible. Namely, the present disclosure also improves the design flexibility of the circuit layout of the backlight module.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
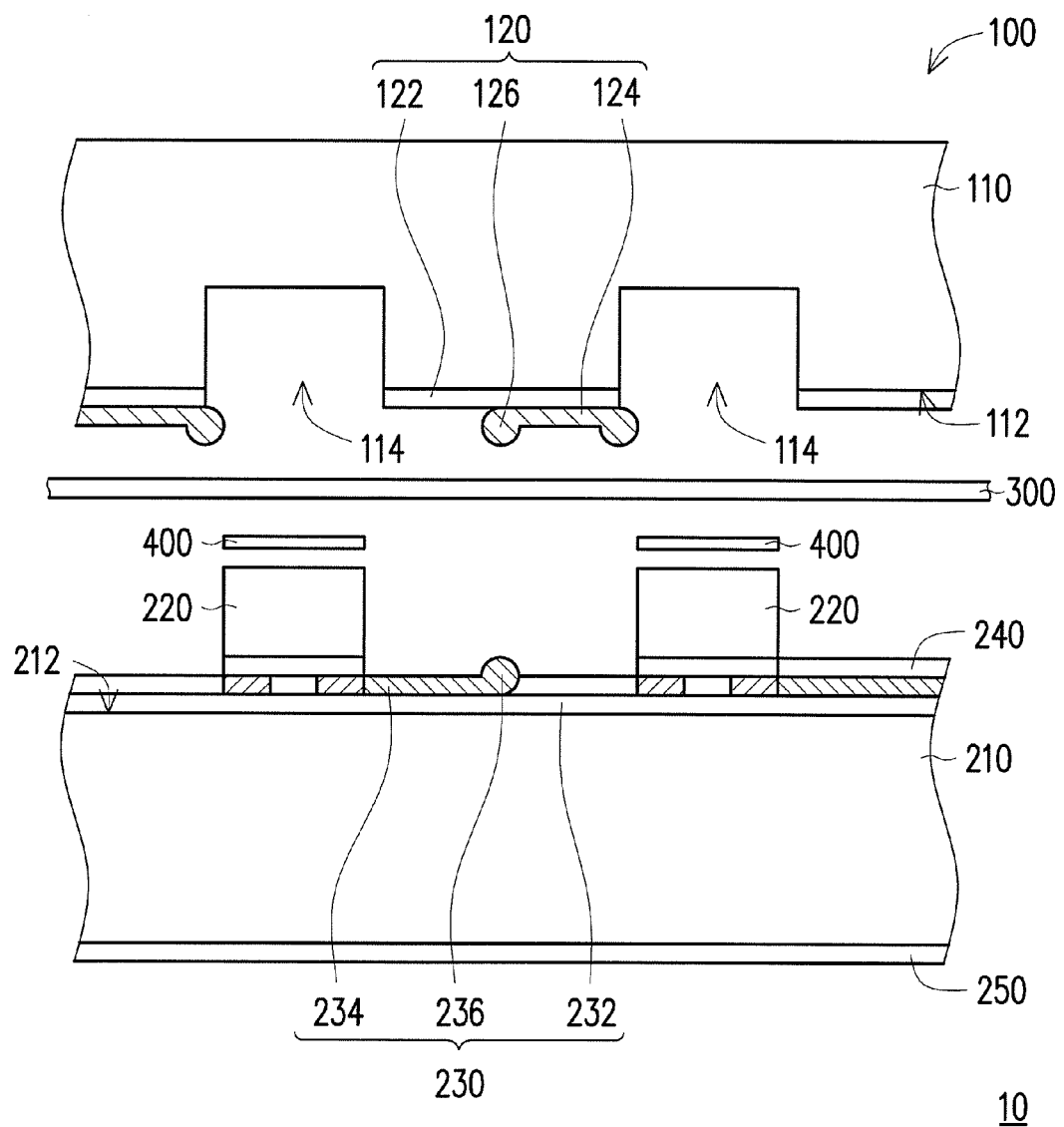
FIG. 1 is a cross-sectional exploded view of a backlight module according to an exemplary embodiment.

In the following detailed description of the preferred embodiments, reference is made to the accompanying drawings which form a part hereof, and in which are shown by way of illustration specific embodiments in which the disclosure may be practiced. Wherever possible, the same reference numbers are used in the drawings and the description to refer to the same or like parts. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Accordingly, the drawings and descriptions will be regarded as illustrative in nature and not as restrictive.

Figure 2:
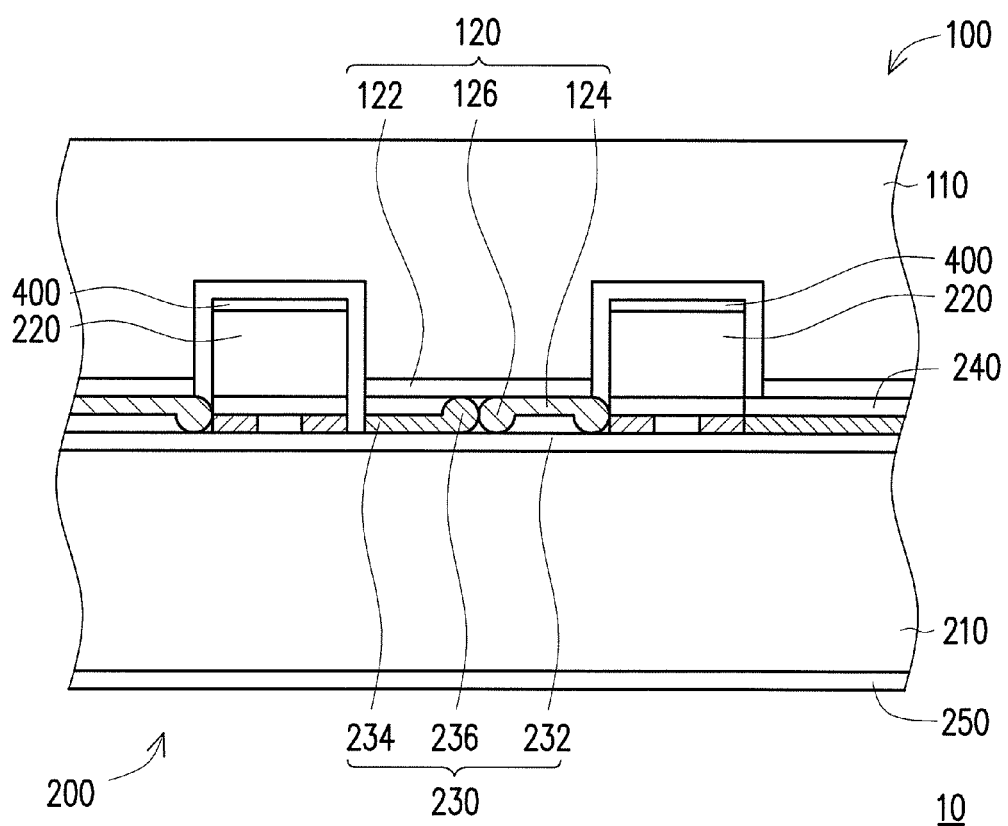
FIG. 2 is a cross-sectional view of the backlight module in FIG. 1 after assembling.

FIG. 1 is a cross-sectional exploded view of a backlight module according to an exemplary embodiment. FIG. 2 is a cross-sectional view of the backlight module in FIG. 1 after assembling. Referring to FIG. 1 and FIG. 2, the present embodiment provides a light guide structure 100, which is adapted to be engaged with a light source module 200 to form a backlight module 10 as shown in FIG. 2. The light source module 200 includes a base 210, at least one light source 220 mounted thereon and a first circuit layer 230. In the present embodiment, the number of the at least one light source 220 may be plural (illustrated as two in FIG. 1), which means the light source module 200 may include a plurality of light sources 220. To be specific, each of the light sources 220 may be a flip chip light-emitting diode (LED), LED chip scale package (CSP), etc. It should be noted that the present embodiment is merely for illustration, and the present disclosure does not limit the number and the type of the light source.

The light guide structure 100 includes a light guide plate 110 and a circuit layer (second circuit layer) 120. The light guide plate 110 includes an engaging surface 112 and at least one recess 114, wherein the engaging surface 112 is adapted to be engaged with the light source module 200. The recess 114 is configured to receive the light source 220, so the number of the recess 114 may be corresponding to the number of the light source 220. Accordingly, in the present embodiment, the number of the recess 114 may be plural (illustrated as two in FIG. 1), which means the light guide structure 100 may include a plurality of recesses 114 disposed at the engaging surface 112 for receiving the light sources 220 respectively.

In the present embodiment, a material of the light guide plate 110 and a material of the base 210 are the same. To be more specific, the material of the light guide plate 110 and the base 210 includes polyethylene terephthalate (PET) or any other suitable materials. The second circuit layer 120 is integrated with the engaging surface 112 of the light guide plate 110 for being electrically connected to first circuit layer 230 of the light sources 220. In details, the second circuit layer 120 may include a sheet material 122 and a plurality of wirings 124, 126. The material of the wirings 124, 126 of the second circuit layer 120 includes indium tin oxide (ITO) or any other suitable materials. The wirings 124, 126 are printed on the sheet material 122, and the sheet material 122 is integrated with the engaging surface 112 by technique such as In-Mold roller (IMR), In-Mold Decoration (IMD), or In-Mold Forming (IMF).

For example, the sheet material 122 with the wirings 124, 126 printed thereon may be disposed on a surface of a mold, and an optical plastic material may be injected into a receiving space of the mold to form the light guide plate 110 having the second circuit layer 120 integrated with the engaging surface 112 thereof. It should be noted the present embodiment is merely for illustration and the present disclosure does not limit the method of the second circuit layer 120 integrated with the engaging surface 112 of the light guide plate 110. Optionally, an optical clear adhesive (OCA) 300 may be disposed between the light guide plate 110 and the base 210 for bonding the light guide structure 100 and the light source module 200, but the present disclosure does not limit the bonding method herein.

Moreover, the light-emitting surface of the light source may be a top surface of the light source. As such, the backlight module 10 may further include a dark material 400 disposed above the light source 220 to decrease the luminance of the light emitted from the top surface of the light source. Specifically, the dark material 400 may be ink, oil, or film in black or gray color. The dark material 400 may be formed on a top surface of the light source 220. Alternatively, the dark material 400 may be disposed between the OCA 300 and the light source 220, or between the OCA 300 and the light guide plate 110. With the dark material 400 located above the light source 220 to decrease the luminance of the light emitted from the top surface of the light source, the illuminance uniformity of the backlight module 10 can be improved. With the disposition described above, the backlight module 10 including the light source module 200 and the light guide structure 100 is formed. The base 210 of the light source module 200 includes a carrying surface 212. The light sources 220 are mounted on the carrying surface 212. The first circuit layer 230 is integrated with the carrying surface 212 and electrically connected to the light sources 220. The engaging surface 112 of the light guide structure 100 is engaged with the carrying surface 212 of the light source module 200, and the recesses 114 of the light guide structure 100 receive the light sources 220 of the light source module 200 respectively. The first circuit layer 230 electrically connected to the light sources 220 is electrically connected to the second circuit layer 120.

In detail, the first circuit layer 230 may include a plurality of first contacts 236 and first traces 234 connected to the first contacts 236. The second circuit layer 120 may include a plurality of second contacts 126 and second traces 124 connected to the second contacts 126. In the present embodiment, the light source module 200 of the backlight module 10 may further include a reflective solder resist layer 240 covering the carrying surface 212 and exposing the second contacts 126, such that the first contacts 236 can be electrically connected to the second contacts 126 for electrically connecting the first circuit layer 230 and the second circuit layer 120. Furthermore, the base 210 of the light source module 200 further includes a back surface opposite to the carrying surface 212, and a reflective sheet 240 is disposed on the back surface.

Figure 3:
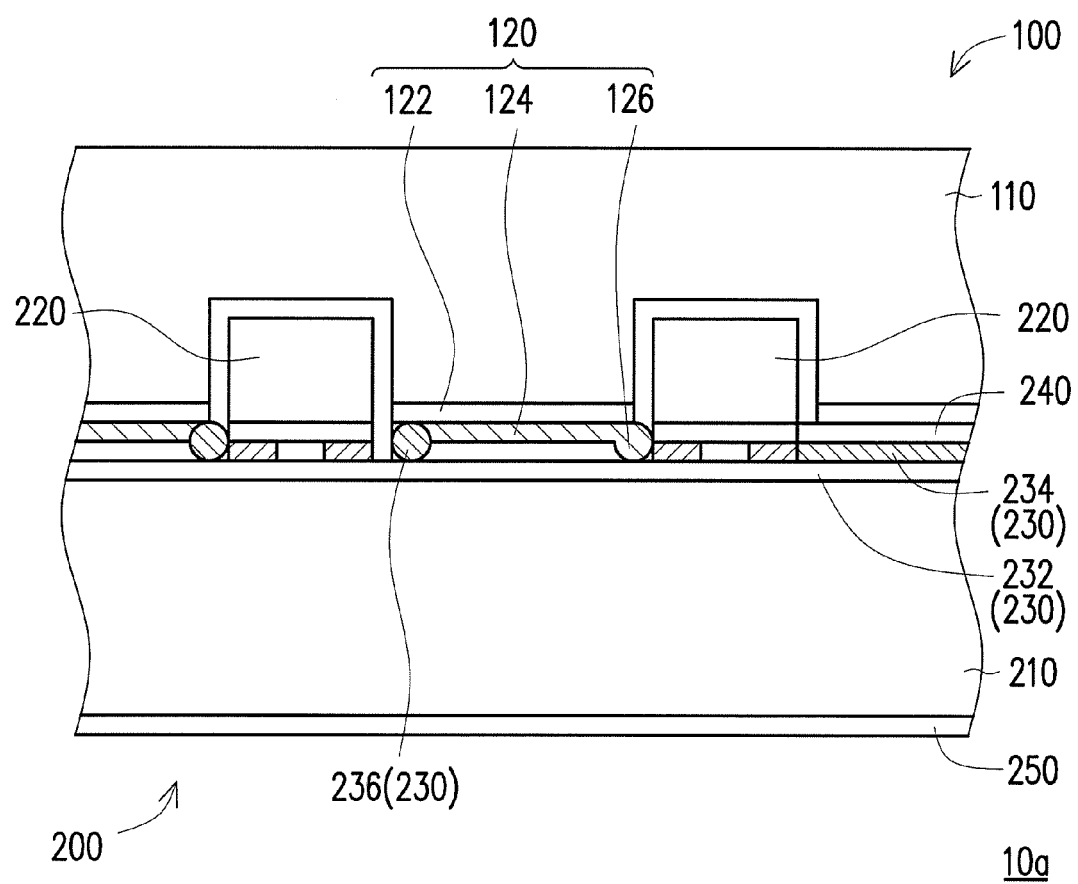
FIG. 3 is a cross-sectional view of the backlight module according to another exemplary embodiment.

FIG. 3 is a cross-sectional view of the backlight module according to another exemplary embodiment. It is noted that the backlight module 10a shown in FIG. 3 contains many features same as or similar to the backlight module 10 disclosed earlier with FIG. 1 and FIG. 2. For purpose of clarity and simplicity, detail description of same or similar features may be omitted. The main differences between the backlight module 10a shown in FIG. 3 and the backlight module 10 shown in FIG. 2 fall in the layout of the first circuit layer 230 and the second circuit layer 120. In the present embodiment, the first contacts 236 of the first circuit layer 230 are at two opposite sides one of the light sources 220 and electrically connected thereto. The second traces 124 of the second circuit layer 120 contact the corresponding first contacts 236 to electrically connect the first contacts 236, and extended to an adjacent light source 220, so as to electrically connecting any two adjacent light sources. Of course, the layout of the first circuit layer 230 and the second circuit layer 120 in the embodiments of FIG. 2 and FIG. 3 is merely for illustration, and the present disclosure does not limit the layout of the first circuit layer 230 and the second circuit layer 120.

With the disposition of the first circuit layer 230 and the second circuit layer 120, which are respectively integrated with the carrying surface 212 of the light source module 200 and the engaging surface 112 of the light guide structure 100, the circuit layout of the backlight module for electrically connecting the light sources 220 can be more flexible.

In sum, the present disclosure provides a light guide structure and a backlight module having the same. The light guide structure is engaged with a light source module to form the backlight module and the light guide structure includes at least one recess. The circuit layer of the light guide structure integrated with a surface of the recess, so the light source of the light source module can be directly embedded in the recess and electrically connected to the circuit layer of the light guide structure. Therefore, the present disclosure simplifies the fabrication process of the backlight module and reduces the fabrication cost of backlight module.

In addition, with the disposition of the circuit layers integrated with the surface of the light source module and the surface of the light guide structure respectively, the circuit layout of the backlight module for electrically connecting the light sources can be more flexible. Furthermore, the material of the light guide plate 110 and that of the base 210 are the same, it enables the light guide plate 110 and the base 210 to have the same thermal expansion or shrink volume. Namely, the present disclosure also improves the design flexibility of the circuit layout and the robustness of the backlight module.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A light guide structure, adapted to be engaged with a light source module, wherein the light source module comprising a base and at least one light source mounted thereon, and the light guide structure comprising:
   a light guide plate comprising an engaging surface and at least one recess, wherein the engaging surface is adapted to be engaged with the light source module, the recess is disposed at the engaging surface for receiving the light source, a material of the light guide plate and a material of the base are the same; and
   a circuit layer integrated with the engaging surface for electrically connecting the light source.

2. The light guide structure in claim 1, wherein the light source is a flip chip light-emitting diode (LED).

3. The light guide structure in claim 1, wherein the light source is a LED chip scale package (CSP).

4. The light guide structure in claim 1, wherein the material of the light guide plate and the base is polycarbonate (PC).

5. The light guide structure in claim 1, wherein the material of the light guide plate and the base is polyethylene terephthalate (PET).

6. The light guide structure in claim 1, wherein a material of the circuit layer is indium tin oxide (ITO).

7. The light guide structure in claim 1, further comprising an optical clear adhesive (OCA) disposed between the light guide plate and the base for bonding the light guide structure and the light source module.

8. The light guide structure in claim 1, wherein the circuit layer is a sheet material integrated with the engaging surface and a plurality of wirings printed on the sheet material.

9. A backlight module, comprising:
a light source module, comprising:
a base comprising a carrying surface;
at least one light source mounted on the carrying surface; and
a first circuit layer integrated with the carrying surface and electrically connected to the light source; and
a light guide structure, comprising:
a light guide plate comprising an engaging surface and at least one recess, the engaging surface engaged with the light source module, the recess disposed at the engaging surface for receiving the light source, wherein a material of the light guide plate and a material of the base are the same; and
a second circuit layer integrated with the engaging surface, and electrically connected to the first circuit layer.

10. The backlight module in claim 9, wherein the light source is a flip chip light-emitting diode (LED).

11. The backlight module in claim 9, wherein the light source is a LED chip scale package (CSP).

12. The backlight module in claim 9, wherein the material of the light guide plate and the base is polycarbonate (PC).

13. The backlight module in claim 9, wherein the material of the light guide plate and the base is polyethylene terephthalate (PET).

14. The backlight module in claim 9, wherein a material of the first circuit layer and the second circuit layer is indium tin oxide (ITO).

15. The backlight module in claim 9, further comprising an optical clear adhesive (OCA) disposed between the light guide plate and the base for bonding the light guide structure and the light source module.

16. The backlight module in claim 9, wherein each of the first circuit layer and the second circuit layer is a sheet material and a plurality of wirings printed on the sheet material.

17. The backlight module in claim 9, wherein the first circuit layer comprises a plurality of first contacts, and the second circuit layer comprises a plurality of second contacts, the first contacts are electrically connected with the second contacts.

18. The backlight module in claim 17, further comprising a reflective solder resist layer covering the carrying surface and exposing the second contacts.

19. The backlight module in claim 9, wherein the base further comprises a back surface opposite to the carrying surface, and a reflective sheet disposed on the back surface.

20. The backlight module in claim 9, further comprising a dark material disposed above the light source.

\* \* \* \* \*